United States Patent
Li (10) Patent No.: US 11,733,817 B2
(45) Date of Patent: Aug. 22, 2023

(54) DISPLAY PANEL AND DISPLAY DEVICE

(71) Applicant: Wuhan China Star Optoelectronics Semiconductor Display Technology Co., Ltd., Hubei (CN)

(72) Inventor: Yuanhang Li, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 532 days.

(21) Appl. No.: 16/966,635

(22) PCT Filed: Jun. 19, 2020

(86) PCT No.: PCT/CN2020/097039
§ 371 (c)(1),
(2) Date: Jul. 31, 2020

(87) PCT Pub. No.: WO2021/227196
PCT Pub. Date: Nov. 18, 2021

(65) Prior Publication Data
US 2023/0092521 A1    Mar. 23, 2023

(30) Foreign Application Priority Data
May 15, 2020   (CN) .......................... 202010414392.1

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 2203/04111* (2013.01); *G06F 2203/04112* (2013.01)

(58) Field of Classification Search
None
See application file for complete search history.

(56) References Cited

U.S. PATENT DOCUMENTS

| 10,644,364 | B2 | 5/2020 | Fortenbacher |
| 2016/0357289 | A1 | 12/2016 | Jeong |
| 2019/0204953 | A1 | 7/2019 | Min et al. |
| 2021/0048908 | A1* | 2/2021 | Dai ........................ H10K 59/38 |

FOREIGN PATENT DOCUMENTS

| CN | 104571747 | 4/2015 |
| CN | 106293202 | 1/2017 |
| CN | 109213369 | 1/2019 |
| CN | 109508118 | 3/2019 |
| CN | 110007810 | 7/2019 |
| CN | 110214303 | 9/2019 |
| JP | 2018-018320 | 2/2018 |

* cited by examiner

*Primary Examiner* — Nicholas J Lee (57) ABSTRACT

A display panel and a display device are provided. The display panel includes a touch layer. The touch layer includes: a first insulating layer, a first metal layer patterned to form a first floating electrode, a second floating electrode and a bridging electrode, a second insulating layer, a second metal layer patterned to form a first touch electrode and a second touch electrode, and a passivation layer. The first touch electrode is electrically connected to the bridging electrode through the via. This solves the short circuit and abnormal capacitance issues of the conventional DOT technique and raises the consistency of display content and the product yield.

18 Claims, 6 Drawing Sheets

DISPLAY PANEL AND DISPLAY DEVICE

RELATED APPLICATIONS

This application is a National Phase of PCT Patent Application No. PCT/CN2020/097039 having International filing date of Jun. 19, 2020, which claims the benefit of priority of Chinese Patent Application No. 202010414392.1 filed on May 15, 2020. The contents of the above applications are all incorporated by reference as if fully set forth herein in their entirety.

FIELD AND BACKGROUND OF THE INVENTION

The present invention relates to a display technique, and more particularly, to a display panel and a display device.

Direct on cell touch (DOT) technique is a package-touch integrated technique. It could integrate the touch layer in the package layer without independently add additional touch layer. Therefore, it has a better aperture rate and bending resistance and could effectively reduce the thickness of the panel and reduce the cost.

In the conventional DOT technique, the electrode in the touch layer is normally in a grid shape. The touch driving electrodes, the touch sensing electrodes and the floating electrodes are positioned in the same layer. The touch driving electrodes, the touch sensing electrodes and the floating electrodes are isolated with each other by disconnection areas. Here, the width of the disconnection area cannot be too large to ensure the optical consistency within the touch layer. However, if the width of the disconnection area is too small, the short circuit phenomenon may occur among the touch driving electrodes, the touch sensing electrodes and the floating electrodes. This makes the capacitance abnormal and influences the product yield.

Therefore, the conventional DOT technique has the short circuit and the abnormal capacitance issues.

SUMMARY OF THE INVENTION

Technical Solution

One objective of an embodiment of the present invention is to provide a display panel and a display device, to solve the short circuit and the abnormal capacitance issues of the conventional DOT technique.

According to an embodiment of the present invention, a display panel is disclosed. The display panel comprises a driving circuit layer, a light emitting layer, a package layer, and a touch layer formed on the package layer. The touch layer comprises: a first insulating layer, formed on the package layer; a first metal layer, formed on the first insulating layer, patterned to form a first floating electrode, a second floating electrode and a bridging electrode; a second insulating layer, formed on the first metal layer and covering the first metal layer, wherein the second insulating layer has a via; a second metal layer, formed on the second insulating layer, patterned to form a first touch electrode and a second touch electrode; and a passivation layer, formed on the second metal layer and covering the second metal layer; wherein the first touch electrode is electrically connected to the bridging electrode through the via, the first touch electrode has a first hallowed area, the second touch electrode has a second hallowed area, a projection of the first hallowed area on the package layer is overlapped with a projection of the first floating electrode on the package layer, and a projection of the second hallowed area on the package layer is overlapped with a projection of the second floating electrode on the package layer.

In the display panel of the present invention, the first touch electrode, the second touch electrode, the first floating electrode, the second electrode and the bridging electrode are all in a grid shape, and an area surrounded by a grid corresponds to a pixel unit.

In the display panel of the present invention, the first touch electrode comprises a disconnection position, and a projection of the disconnection position on the package layer falls within a projection of the bridging electrode on the package layer.

In the display panel of the present invention, the display panel further comprises a plurality of first touch electrodes and a plurality of second touch electrodes. The first touch electrodes are connected in series along a first direction and distributed in an array along a second direction, the second touch electrodes extend along the second direction and are equally spaced and distributed along the first direction, and the first direction is vertical to the second direction.

In the display panel of the present invention, the first touch electrode is a touch driving electrode, and the second touch electrode is a touch sensing electrode.

In the display panel of the present invention, the first touch electrode is a touch sensing electrode, and a second touch electrode is a touch driving electrode.

In the display panel of the present invention, the first floating electrode and the second floating electrode comprise a bending identification electrode, wherein the bending identification electrode is distributed in an array.

In the display panel of the present invention, the first metal layer further comprises a bending identification wire, and the bending identification wire is connected to the bending identification electrode.

In the display panel of the present invention, a projection of the bending identification wire on the package layer falls within a projection of the first touch electrode and the second touch electrode on the package layer.

In the display panel of the present invention, the first metal layer and the second metal layer are manufactured with a same material, which comprises one or more of aluminum, copper, silver, molybdenum, titanium, and ITO.

According to an embodiment of the present invention, a display device is disclosed. The display device comprises a display panel. The display panel comprises a driving circuit layer, a light emitting layer, a package layer, and a touch layer formed on the package layer. The touch layer comprises: a first insulating layer, formed on the package layer; a first metal layer, formed on the first insulating layer, patterned to form a first floating electrode, a second floating electrode and a bridging electrode; a second insulating layer, formed on the first metal layer and covering the first metal layer, wherein the second insulating layer has a via; a second metal layer, formed on the second insulating layer, patterned to form a first touch electrode and a second touch electrode; and a passivation layer, formed on the second metal layer and covering the second metal layer; wherein the first touch electrode is electrically connected to the bridging electrode through the via, the first touch electrode has a first hallowed area, the second touch electrode has a second hallowed area, a projection of the first hallowed area on the package layer is overlapped with a projection of the first floating electrode on the package layer, and a projection of the second hallowed area on the package layer is overlapped with a projection of the second floating electrode on the package layer.

In the display device of the present invention, the first touch electrode, the second touch electrode, the first floating electrode, the second electrode and the bridging electrode are all in a grid shape, and an area surrounded by a grid corresponds to a pixel unit.

In the display device of the present invention, the first touch electrode comprises a disconnection position, and a projection of the disconnection position on the package layer falls within a projection of the bridging electrode on the package layer.

In the display device of the present invention, the display panel further comprises a plurality of first touch electrodes and a plurality of second touch electrodes. The first touch electrodes are connected in series along a first direction and distributed in an array along a second direction, the second touch electrodes extend along the second direction and are equally spaced and distributed along the first direction, and the first direction is vertical to the second direction.

In the display device of the present invention, the first touch electrode is a touch driving electrode, and the second touch electrode is a touch sensing electrode.

In the display device of the present invention, the first touch electrode is a touch sensing electrode, and a second touch electrode is a touch driving electrode.

In the display device of the present invention, the first floating electrode and the second floating electrode comprise a bending identification electrode, wherein the bending identification electrode is distributed in an array.

In the display device of the present invention, the first metal layer further comprises a bending identification wire, and the bending identification wire is connected to the bending identification electrode.

In the display device of the present invention, a projection of the bending identification wire on the package layer falls within a projection of the first touch electrode and the second touch electrode on the package layer.

In the display device of the present invention, the first metal layer and the second metal layer are manufactured with a same material, which comprises one or more of aluminum, copper, silver, molybdenum, titanium, and ITO.

Advantageous Effect

The present invention proposes a display panel and a display device. The display panel comprises a driving circuit layer, a light emitting layer, a package layer, and a touch layer formed on the package layer. The touch layer comprises: a first insulating layer, formed on the package layer; a first metal layer, formed on the first insulating layer, patterned to form a first floating electrode, a second floating electrode and a bridging electrode; a second insulating layer, formed on the first metal layer and covering the first metal layer, wherein the second insulating layer has a via; a second metal layer, formed on the second insulating layer, patterned to form a first touch electrode and a second touch electrode; and a passivation layer, formed on the second metal layer and covering the second metal layer; wherein the first touch electrode is electrically connected to the bridging electrode through the via, the first touch electrode has a first hallowed area, the second touch electrode has a second hallowed area, a projection of the first hallowed area on the package layer is overlapped with a projection of the first floating electrode on the package layer, and a projection of the second hallowed area on the package layer is overlapped with a projection of the second floating electrode on the package layer. In contrast to the conventional art having the floating electrode and the touch electrode in the same layer, the display panel and the display device of an embodiment of the present invention position the floating electrode and the touch electrode in different layers. Therefore, it does not need to consider the disconnection area between the floating electrode and the touch electrode when the floating electrode and the touch electrode are in the same layer. In this way, it prevents the short circuit problem between the first floating electrode and the first touch electrode or between the second floating electrode and the second touch electrode without sacrificing the optical consistency. This solves the short circuit and abnormal capacitance issues of the conventional DOT technique and raises the consistency of display content and the product yield. Furthermore, the bending identification wire is positioned in the first metal layer and a part of the floating electrode in the first metal layer is used as the identification sensing electrode of the bending position. It utilizes the self-capacitance to identify the bending position and thus realizes the integration of the touch electrode and the bending identification electrode.

BRIEF DESCRIPTION OF THE SEVERAL VIEWS OF THE DRAWINGS

These and other features, aspects and advantages of the present disclosure will become understood with reference to the following description, appended claims and accompanying figures.

DESCRIPTION OF SPECIFIC EMBODIMENTS OF THE INVENTION

The present invention provides a display panel to alleviate the above-mentioned short circuit and abnormal capacitance issues of the conventional DOT technique.

Figure 1:
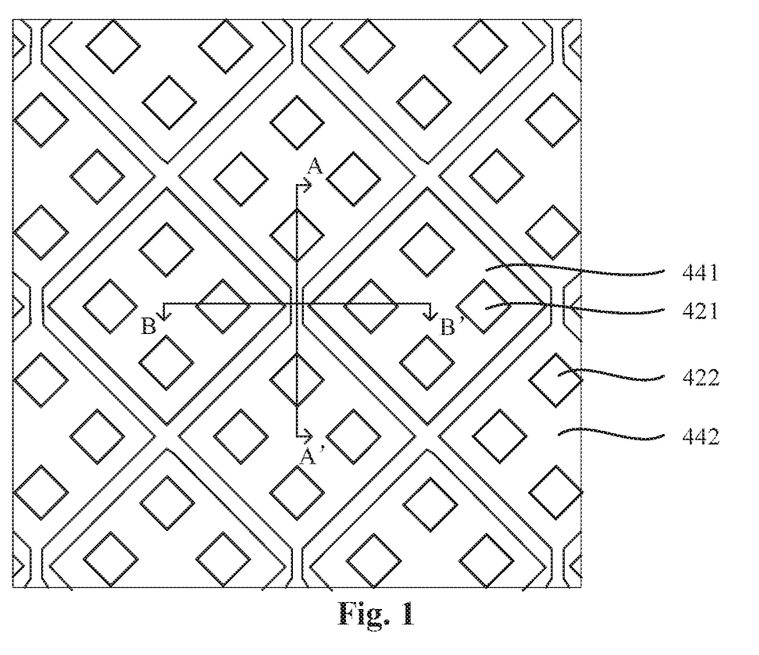
FIG. 1 is a simplified top-down view of a display panel according to an embodiment of the present invention.
Figure 2:
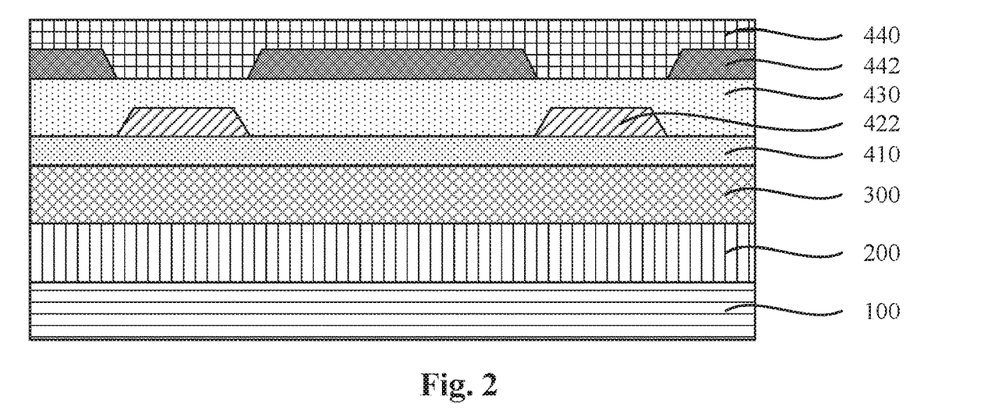
FIG. 2 is a diagram of a cross-section along the A-A' line of the display panel according to an embodiment of the present invention.
Figure 3:
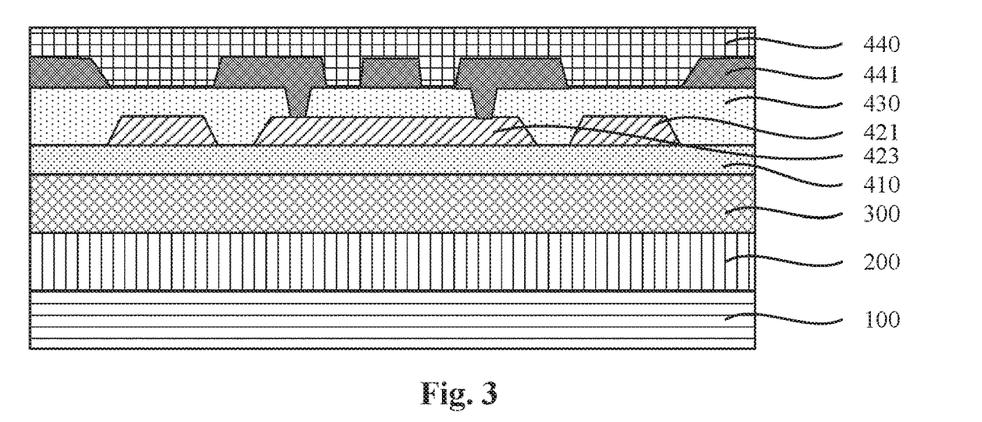
FIG. 3 is a diagram of a cross-section along the B-B' line of the display panel according to an embodiment of the present invention.

Please refer to FIGS. 1-3. FIG. 1 is a simplified top-down view of a display panel according to an embodiment of the present invention. FIG. 2 is a diagram of a cross-section along the A-A' line of the display panel according to an embodiment of the present invention. FIG. 3 is a diagram of a cross-section along the B-B' line of the display panel according to an embodiment of the present invention.

The display panel of this embodiment comprises a driving circuit layer 100, a light emitting layer 200, a package layer 300 and a touch layer 400. The touch layer 400 is formed on the package layer 300. The touch layer comprises: a first insulating layer 410, a first metal layer 420, a second insulating layer 430, a second metal layer 440, and a passivation layer 450.

The first insulating layer 410 is formed on the package layer. The first metal layer 420 is formed on the first insulating layer 410 and is patterned to form a first floating electrode 421, a second floating electrode 422 and a bridging electrode 423. The second insulating layer 430 is formed on the first metal layer 420 and covering the first metal layer 420. The second insulating layer 430 has a via. The second metal layer 440 is formed on the second insulating layer 430 and is patterned to form a first touch electrode 441 and a second touch electrode 442. The first touch electrode 441 is electrically connected to the bridging electrode 423 through the via. The first touch electrode 441 has a first hallowed area, and the second touch electrode 442 has a second hallowed area. The projection of the first hallowed area on the package layer 300 is overlapped with the projection of the first floating electrode 421 on the package layer 300. The projection of the second hallowed area on the package layer 300 is overlapped with the projection of the second floating electrode 422 on the package layer 300. The passivation layer 450 is formed on the second metal layer 440 and covering the second metal layer 440.

This embodiment provides a display panel. The display panel positions the first floating electrode and the second floating electrode in the first metal layer. The first touch electrode is in the second metal layer and a position in the first touch electrode corresponding to the first floating electrode has the first hallowed area. The second touch electrode is in the second metal layer and a position in the second touch electrode corresponding to the second floating electrode has the second hallowed area. In the conventional art, the floating electrode and the touch electrode are in the same layer. In contrast, in this embodiment, the floating electrode and the touch electrode are in different layers. Therefore, it does not need to consider the disconnection area between the floating electrode and the touch electrode when the floating electrode and the touch electrode are in the same layer. In this way, it prevents the short circuit problem between the first floating electrode and the first touch electrode or between the second floating electrode and the second touch electrode without sacrificing the optical consistency. This solves the short circuit and abnormal capacitance issues of the conventional DOT technique and raises the consistency of display content and the product yield.

The first insulating layer 410 is formed on the package layer 300 for interface repair and planarization such that the first insulating layer 410 could provide a good basis structure for the following first metal layer 420. The material of the first insulating layer 410 comprises at least one of silicon nitride, silicon oxide, and silicon oxynitride. The first insulating layer 410 could be a single-layer structure of silicon nitride, silicon oxide, or silicon oxynitride. Or, the first insulating layer 410 could be a stacked-layer structure of silicon nitride and silicon oxide.

The second insulating layer 430 is formed on the first metal layer 420 and covering the first metal layer 420 for isolating the first metal layer 420 from the second metal layer 440. Similarly, the second insulating layer 430 could be a single-layer structure of silicon nitride, silicon oxide, or silicon oxynitride. Or, second insulating layer 430 could be a stacked-layer structure of silicon nitride and silicon oxide.

The passivation layer 450 is formed on the second metal layer 440 and covering the second metal layer 440. The passivation layer 450 is used to protect the second metal layer 440 and isolate the second metal layer 440 from external metal, air, or water. The material of the passivation layer 450 comprises silicon nitride, silicon oxide, and silicon oxynitride. The passivation layer 450 could be a single-layer structure of silicon nitride, silicon oxide, or silicon oxynitride. Or, passivation layer 450 could be a stacked-layer structure of silicon nitride and silicon oxide.

In the following disclosure, the single film layer of the first metal layer and the second metal layer and their stacked structure will be illustrated according to embodiments of the present invention.

Figure 4:
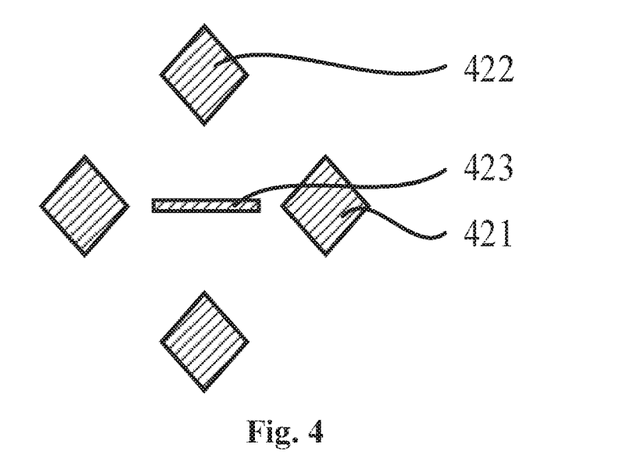
FIG. 4 is a diagram showing the first metal layer of the display according to the first embodiment of the present invention.

Please refer to FIG. 4. FIG. 4 is a diagram showing the first metal layer of the display according to the first embodiment of the present invention. The first metal layer 420 comprises the first floating electrodes 431, the second floating electrodes 422, and the bridging electrodes 423 (only one bridging electrode 423 is shown here, but the first metal layer 420 could have more). In this embodiment, the first floating electrodes 431 are not connected to each other. The second floating electrodes 422 are not connected to each other. The bridging electrodes 423 are not connected to each other. The first floating electrodes 431 are not connected to each other. The second floating electrodes 422 are not connected to each other. The bridging electrodes 423 are not connected to each other. Furthermore, the first floating electrodes 421, the second floating electrodes 422, and the bridging electrodes 423 are not connected to each other as well.

The shape and the size of the first floating electrodes 421 is the same. The shape and the size of the second floating electrodes 422 is the same. The shape and the size of the bridging electrodes 423 is the same. The first floating electrodes 421, the second floating electrodes 422 and the bridging electrodes 423 are all in the grid shape. The area surrounding by the gird shape corresponds to the pixel unit.

In one embodiment, the shape of the first floating electrodes 421 is the same as the shape of the second floating electrodes 422. The shape of the first floating electrodes 421 could be one of diamond, rectangular, triangle, circle, and any other polygons.

In another embodiment, the first floating electrode 421 and the second floating electrode 422 could have different shapes or sizes or both. For example, in the case that the first floating electrode 421 and the second floating electrode 422 have the same shape but different sizes, the shape of the first floating electrode 421 could be diamond, rectangular, triangle, circle or any other polygons. In the case that the first floating electrode 421 and the second floating electrode 422 have the same size but different shapes, the shapes of the first floating electrode 421 and the second floating electrode 422 could be one or two of diamond, rectangular, triangle, circle and any other polygons.

Figure 5:
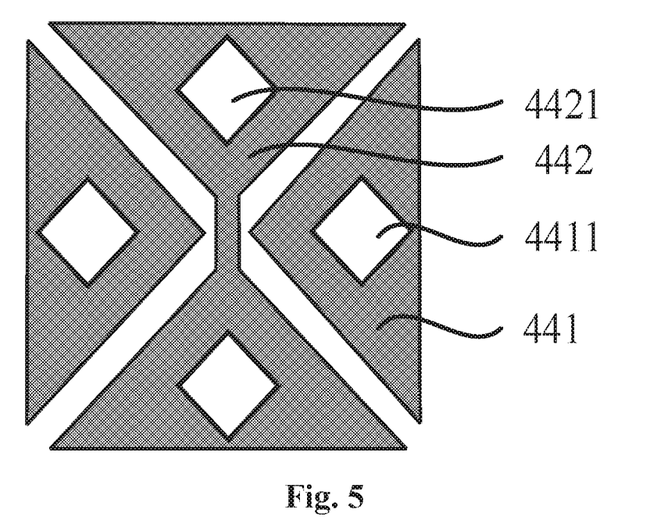
FIG. 5 is a diagram showing the second metal layer of the display according to the first embodiment of the present invention.

Please refer to FIG. 5. FIG. 5 is a diagram showing the second metal layer of the display according to the first embodiment of the present invention. As shown in FIG. 5, the second metal layer 440 comprises the first touch electrodes 441 and the second touch electrodes 442.

In the second metal layer 440, the first touch electrodes 441 are distributed in an array along the second direction. The first touch electrodes 441 are not connected to each other but electrically connected to the bridging electrode 423 in the first metal layer 420 through the via inside the second insulating layer 430. Therefore, the first touch electrodes 441 are connected in series along the first direction. Furthermore, the second touch electrodes 442 extends along the second direction and are equally spaced and distributed along the first direction.

The first touch electrodes 441 and the second touch electrode 442 are all in grid shape. The area surrounded by the grid corresponds to the pixel unit.

The first touch electrode 441 could be the touch driving electrode and the second touch electrode 442 could be the touch sensing electrode. Or, the first touch electrode 441 could be the touch sensing electrode and the second touch electrode 442 could be the touch driving electrode. All these changes fall within the scope of the present invention.

The first direction is vertical to the second direction. The first direction could be a horizontal direction and the second direction is a vertical direction. Or, the first direction could be a vertical direction and the second direction is a horizontal direction.

In one embodiment, the first touch electrodes 441 and the second touch electrodes 442 are all strip electrodes. Some of the first touch electrodes 441 distributed in an array along the second direction are equally spaced and distributed along the first direction and extends along the first direction. Some of the first touch electrodes 441 distributed in an array along the first direction are equally spaced and distributed along the second direction and extends along the second direction. Here, the first direction is vertical to the second direction.

In another embodiment, the first touch electrodes 441 and the second touch electrodes 442 are all diamond electrodes. The first touch electrodes 441 comprise the diamond electrodes pieces distributed in an array along the second direction. The diamond electrodes pieces are connected in series in a fixed interval through the bridging electrodes 423 along the first direction. The second touch electrodes 442 comprise some diamond electrodes pieces connected with each other in a fixed interval along the first direction. The second touch electrodes 442 are equally spaced and distributed along the first direction.

In other embodiments, the shape of the first touch electrodes 441 and the second touch electrodes could be a circle, a triangle or any other shape.

Figure 6:
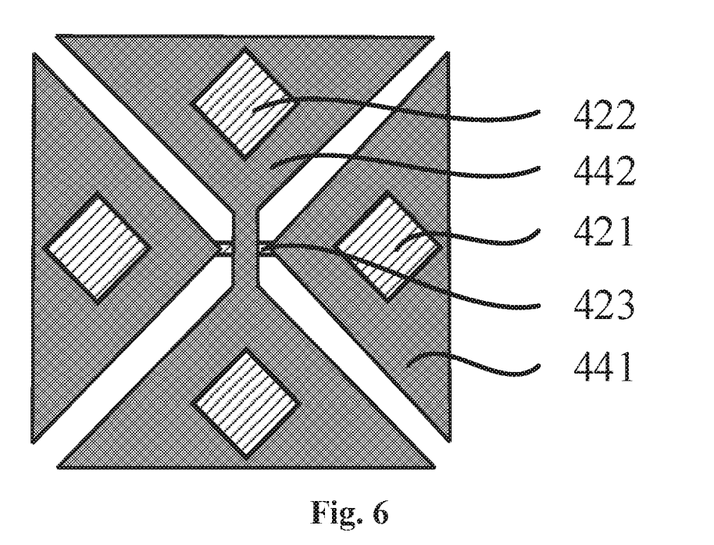
FIG. 6 is a diagram showing the stacked first and second metal layers of the display according to the first embodiment of the present invention.

Please refer to FIG. 6. FIG. 6 is a diagram showing the stacked first and second metal layers of the display according to the first embodiment of the present invention. The first touch electrode 441 has a first hallowed area 4411. The projection of the first hallowed area 4411 on the package layer 300 is completely overlapped with the projection of the first floating electrode 421 on the package layer. That is, the first hallowed area 4411 corresponds to the first floating electrode 421. The second touch electrode 442 has a second hallowed area 4421. The projection of the second hallowed area 4421 on the package layer 300 is completely overlapped with the projection of the second floating electrode 422. That is, the second hallowed area 4421 corresponds to the second floating electrode 422.

Because the first hallowed area 4411 corresponds to the first floating electrode 421 and the second hallowed area 4421 corresponds to the second floating electrode 422, the first floating electrode 421 is used to adjust the capacitance of the first touch electrode 441 and the second floating electrode 422 is used to adjust the capacitance of the second touch electrode 442. Therefore, the size of the first hallowed area 4411 is determined by the capacitance to be adjusted of the first touch electrode 441. The size of the second hallowed area 4421 is determined by the capacitance to be adjusted of the second touch electrode 442. Accordingly, the size and the shape of the first floating electrode 421 are determined by the size and the shape of the first hallowed area 4411. The size and the shape of the second floating electrode 422 are determined by the size and the shape of the second hallowed area 4421.

In this embodiment, the first hallowed areas 4411 have the same size and the same shape and the first hallowed areas 4411 are positioned at the same locations of the first touch electrodes 441. Similarly, the second hallowed areas 4421 have the same size and the same shape and the second hallowed areas 4421 are positioned at the same locations of the second touch electrodes 442. The size of the first hallowed area 4411 could be determined according to the actual needs of the first touch electrode 441. The size of the second hallowed area 4421 could be determined according to the actual needs of the second touch electrode 442.

On a single piece of electrode, such as a single diamond touch electrode, the number of the first hallowed area 4411 or the second hallowed area 4421 could be one or more. The actual number and the position could be designed according to the actual needs and thus are not limited here. The size and the shape of the first hallowed area 4411 could be the same as those of the second hallowed area 4421. Or, the size or the shape of the first hallowed area 4411 could be different from the size or the shape of the second hallowed area 4421. There is no limitation here. The shape of the hallowed area could be diamond, rectangular, triangle, circle or any other polygons.

In this embodiment, the first hallowed area is positioned in the first touch electrode 441 and the first hallowed area corresponds to the first floating electrode 421 of the first metal layer 420. In addition, the second hallowed area is positioned in the second touch electrode 442 and the second hallowed area corresponds to the second floating electrode 422 of the first metal layer 420. In contrast, in the conventional art, the floating electrode and the touch electrode are in the same layer. In this embodiment, the floating electrode and the touch electrode are in different layer. Therefore, it does not need to consider the disconnection area between the floating electrode and the touch electrode when the floating electrode and the touch electrode are in the same layer. In this way, it prevents the short circuit problem between the first floating electrode and the first touch electrode or between the second floating electrode and the second touch electrode without sacrificing the optical consistency. This solves the short circuit and abnormal capacitance issues of the conventional DOT technique and raises the consistency of display content and the product yield.

The first touch electrode 441 further comprises a disconnection position 4412. projection of the disconnection position 4412 on the package layer 300 falls in the projection of the bridging electrode 423 on the package layer 300. That is, the projection of the bridging electrode 423 on the package layer 300 comprises and is larger than the projection of the disconnection position 4412 on the package layer 300. This could ensure that the first touch electrode 441 is connected to the bridging electrode 423 through the via and further raise the optical consistency of the display panel.

The second metal layer 440 and the first metal layer 420 should be made of the same material. That is, the first touch electrode, the second touch electrode, the first floating electrode, the second floating electrode and the bridging electrode should be made of the same material to ensure the optical consistency of the display panel and the first electrical consistency of the first touch electrode.

The second metal layer 440 and the first metal layer 420 are both in the grid shape. The grid corresponds to the edges of the corresponding pixel unit. This allows the first metal layer 420 and the second metal layer 440 to be made of transparent metal or non-transparent metal. Thus, this configuration allows a wider range of the material selection of the first metal layer 420 and the second metal layer 440.

The material of the first metal layer 420 and the second metal layer 440 comprises, but not limited to, one or more of aluminum, copper, silver, molybdenum, titanium and ITO. The first metal layer 420 and the second metal layer 440 could be a single-layer film structure, a double-layer film structure (such as titanium/aluminum, titanium/copper, or molybdenum/aluminum), or a triple-layer film structure (such as titanium/aluminum/titanium, titanium/copper/titanium or molybdenum/aluminum/molybdenum).

The first touch electrode, the second touch electrode, the first floating electrode, the second floating electrode and the bridging electrode are all in grid shape. The area surrounding by the grid corresponds to the pixel unit. This not only ensures the light passing effect of the display panel but also raises the flexibility and the ductility of the display panel. This allows the display panel to be used in the flexible display applications.

Figure 7:
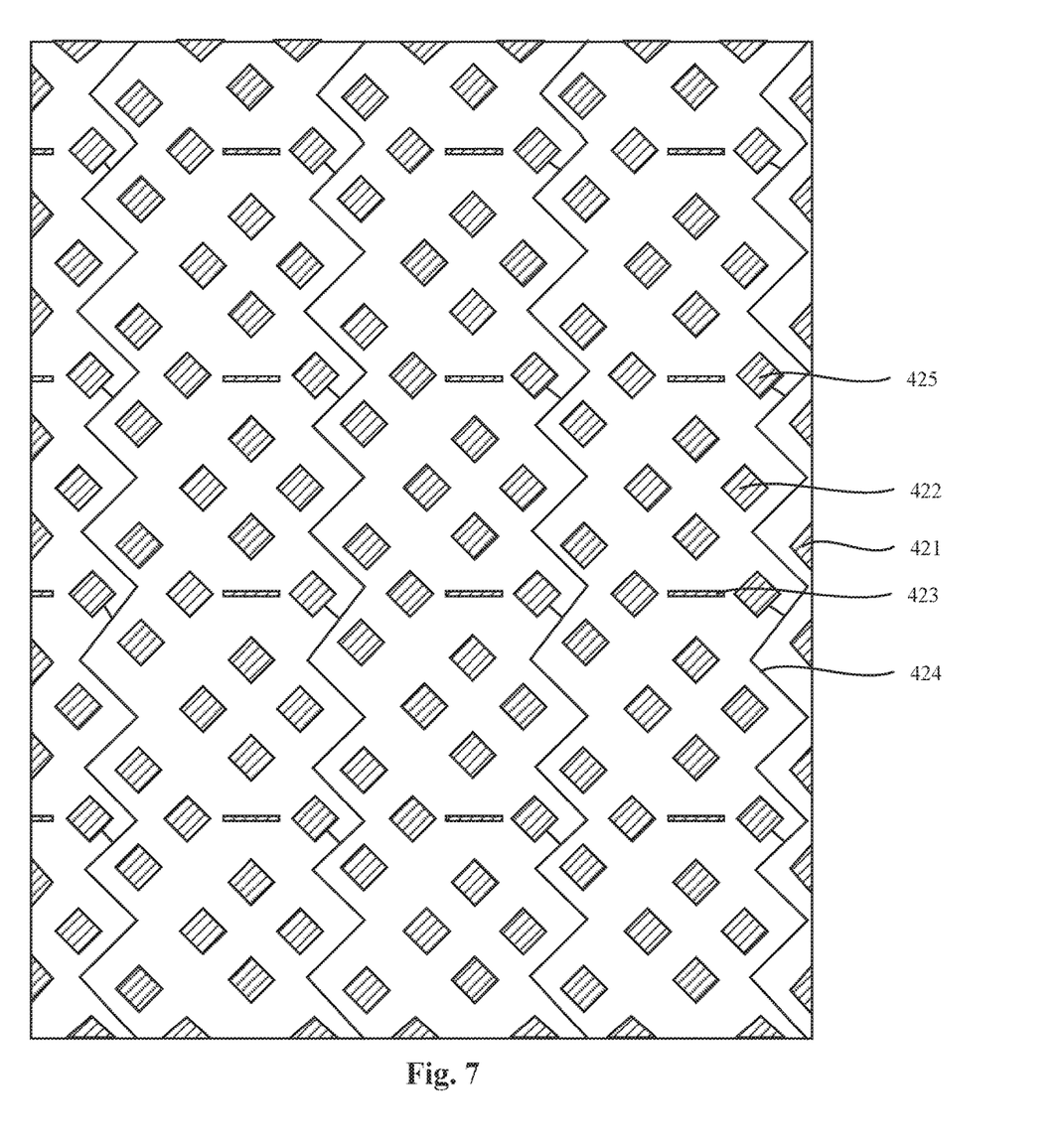
FIG. 7 is a diagram showing the first metal layer of the display according to the second embodiment of the present invention.

In another embodiment, please refer to FIG. 7. FIG. 7 is a diagram showing the first metal layer of the display according to the second embodiment of the present invention. As shown in FIG. 7, the first metal layer 420 comprises the first floating electrodes 421, the second floating electrodes 422, the bridging electrode 423s, and the bending identification wires 424. In this embodiment, the bending identification wire is a polyline.

The first floating electrodes 421 have the same size and shape. The second floating electrodes 422 have the same size and shape. The bridging electrodes 423 have the same size and shape. The first floating electrode 421 and the second floating electrode 422 have the same size and shape. The shape of the first floating electrodes 421 could be one of diamond, rectangular, triangle, circle, and any other polygons. The first floating electrode 421, the second floating electrode 422, and bridging electrode 423 are all in grid shape. The area surrounded by the grid corresponds to the pixel unit.

The first floating electrode 421 and/or the second floating electrode 422 comprise the bending identification floating electrodes 425. The bending identification floating electrodes 425 are distributed in an array. The bending identification electrodes 425 are connected to the bending identification wires 424. The bending identification electrodes 425 could be arranged according to the bending location to be identified in the display panel and the number and position of the bending identification electrodes 425 are not limited. When the display panel performs a bending identification operation, the bending identification wire 425 sends an identification signal to the bending identification electrode 425. Due to the self-capacitance mechanism of the bending identification electrodes 424, the bending position in the display panel could be identified.

In an embodiment, a part of the floating electrodes in the first metal layer 420 is used as the bending identification electrodes to identify the location of the bending position by the self-capacitance mechanism. This achieves the integration of the touch electrodes and the bending identification electrodes.

Figure 8:
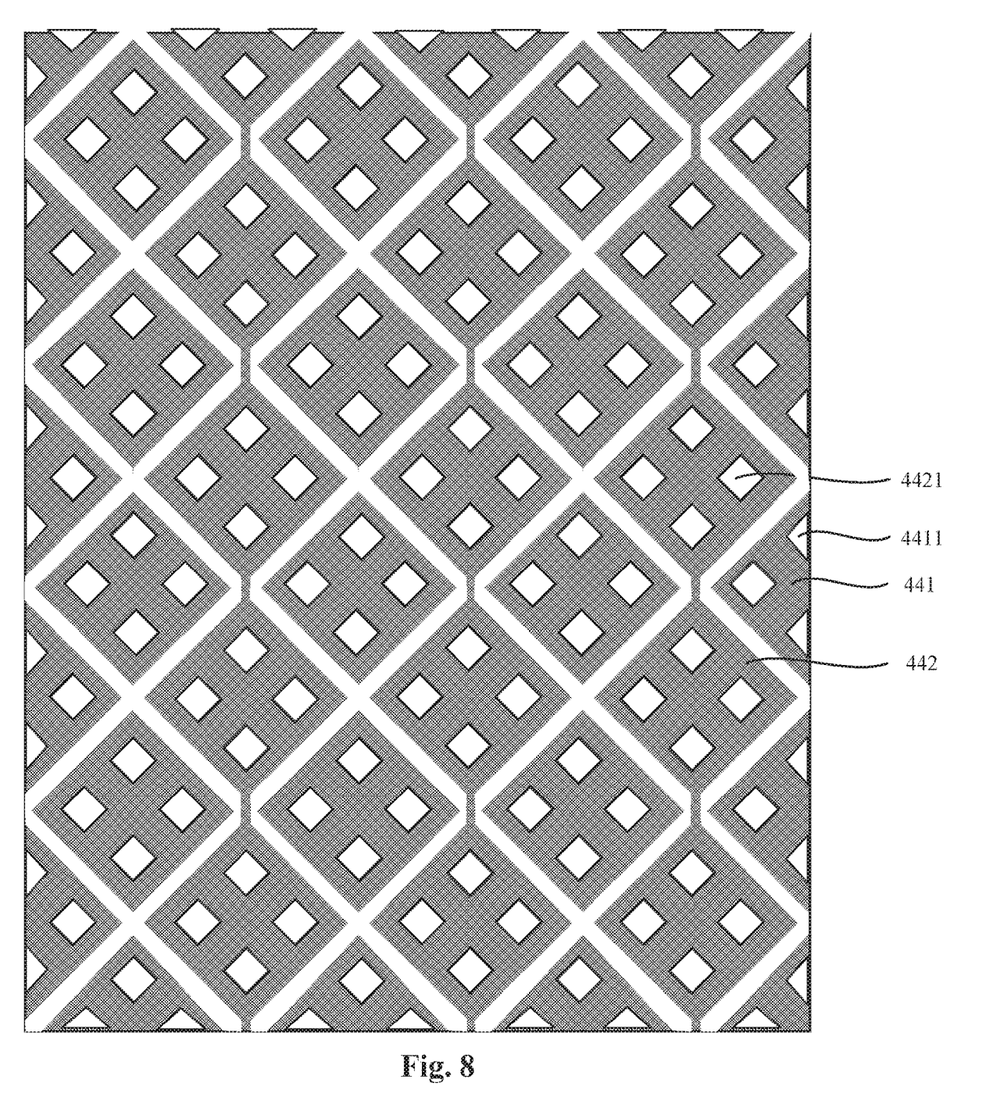
FIG. 8 is a diagram showing the second metal layer of the display according to the second embodiment of the present invention.

Please refer to FIG. 8. FIG. 8 is a diagram showing the second metal layer of the display according to the second embodiment of the present invention. As shown in FIG. 8, the second metal layer 440 comprises the first touch electrodes 441 and the second touch electrodes 442.

In the second metal layer 440, the first touch electrodes 441 are distributed in an array along the second direction. The first touch electrodes 441 are not connected to each other but electrically connected to the bridging electrode 423 of the first metal layer 420 through the via in the second insulating layer 430 such that the first touch electrodes 441 are connected in series along the first direction. In addition, the second touch electrodes 442 extend along the second direction and are equally spaced and distributed along the first direction.

The first touch electrodes 441 and the second touch electrodes 442 are all in the grid shape. The shape surrounded by the grid corresponds to the pixel unit.

The first touch electrode 441 could be the touch driving electrode and the second touch electrode 442 could be the touch sensing electrode. Or, the first touch electrode 441 could be the touch sensing electrode and the second touch electrode 442 could be the touch driving electrode. All these changes fall within the scope of the present invention.

The first direction is vertical to the second direction. The first direction could be a horizontal direction and the second direction is a vertical direction. Or, the first direction could be a vertical direction and the second direction is a horizontal direction.

Figure 9:
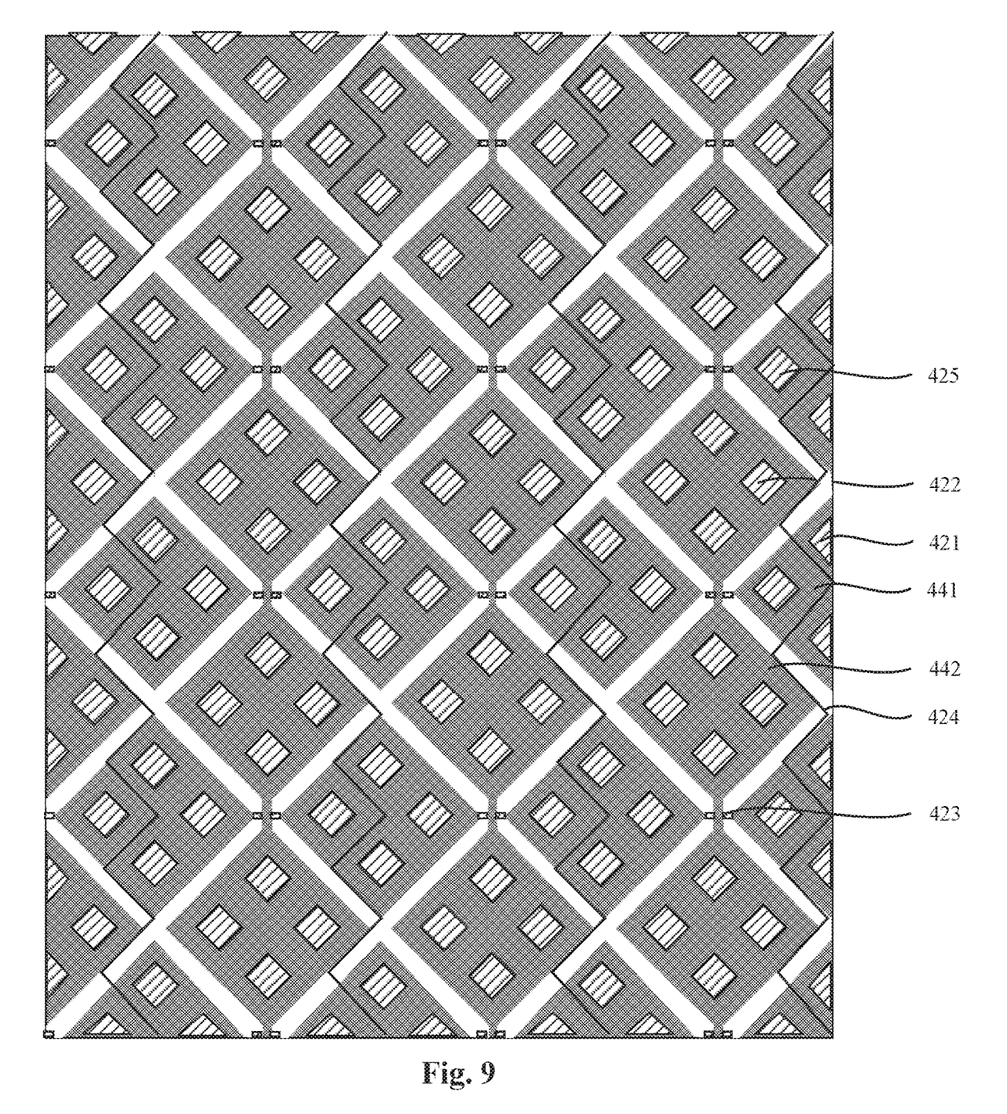
FIG. 9 is a diagram showing the stacked first and second metal layers of the display according to the second embodiment of the present invention.

Please refer to FIG. 9. FIG. 9 is a diagram showing the stacked first and second metal layers of the display according to the second embodiment of the present invention. The first touch electrode 441 has a first hallowed area 4411. The projection of the first hallowed area 4411 on the package layer 300 is completely overlapped with the projection of the first floating electrode 421 on the package layer. That is, the first hallowed area 4411 corresponds to the first floating electrode 421. The second touch electrode 442 has a second hallowed area 4421. The projection of the second hallowed area 4421 on the package layer 300 is completely overlapped with the projection of the second floating electrode 422. That is, the second hallowed area 4421 corresponds to the second floating electrode 422.

The bending identification wire 424 corresponds to the edges of the grid of the first touch electrodes 441 and/or the second touch electrodes 442. This ensures the optical consistency of the display panel.

The first touch electrode 441 further comprises a disconnection position 4412. The projection of the disconnection position 4412 on the package layer 300 falls in the projection of the bridging electrode 423 on the package layer 300. That is, the projection of the bridging electrode 423 on the package layer 300 comprises and is larger than the projection of the disconnection position 4412 on the package layer 300. This could ensure that the first touch electrode 441 is connected to the bridging electrode 423 through the via and further raise the optical consistency of the display panel.

In this embodiment, the first hallowed area is positioned in the first touch electrode 441 and the first hallowed area corresponds to the first floating electrode 421 of the first metal layer 420. In addition, the second hallowed area is positioned in the second touch electrode 442 and the second hallowed area corresponds to the second floating electrode 422 of the first metal layer 420. In contrast, in the conventional art, the floating electrode and the touch electrode are in the same layer. In this embodiment, the floating electrode and the touch electrode are in different layer. Therefore, it does not need to consider the disconnection area between the floating electrode and the touch electrode when the floating electrode and the touch electrode are in the same layer. In this way, it prevents the short circuit problem between the first floating electrode and the first touch electrode or between the second floating electrode and the second touch electrode without sacrificing the optical consistency. This solves the short circuit and abnormal capacitance issues of the conventional DOT technique and raises the consistency of display content and the product yield. Furthermore, the bending identification wires are positioned in the first metal layer 420 and a part of the floating electrodes in the first metal layer 420 are utilized as the identification electrodes for identifying the bending location. It utilizes the self-capacitance to identify the bending position and thus realizes the integration of the touch electrode and the bending identification electrode.

The second metal layer 440 and the first metal layer 420 should be made of the same material. That is, the first touch electrode, the second touch electrode, the first floating electrode, the second floating electrode and the bridging electrode should be made of the same material to ensure the optical consistency of the display panel and the first electrical consistency of the first touch electrode.

The second metal layer 440 and the first metal layer 420 are both in the grid shape. The grid corresponds to the edges of the corresponding pixel unit. This allows the first metal layer 420 and the second metal layer 440 to be made of transparent metal or non-transparent metal. Thus, this configuration allows a wider range of the material selection of the first metal layer 420 and the second metal layer 440.

The material of the first metal layer 420 and the second metal layer 440 comprises, but not limited to, one or more of aluminum, copper, silver, molybdenum, titanium and ITO. The first metal layer 420 and the second metal layer 440 could be a single-layer film structure, a double-layer film structure (such as titanium/aluminum, titanium/copper, or molybdenum/aluminum), or a triple-layer film structure (such as titanium/aluminum/titanium, titanium/copper/titanium or molybdenum/aluminum/molybdenum).

The first touch electrode, the second touch electrode, the first floating electrode, the second floating electrode and the bridging electrode are all in grid shape. The area surrounding by the grid corresponds to the pixel unit. This not only ensures the light passing effect of the display panel but also raises the flexibility and the ductility of the display panel. This allows the display panel to be used in the flexible display applications.

The present invention also provides a display device. The display device comprises a display panel. The display panel comprises a driving circuit layer, a light emitting layer, a package layer, and a touch layer formed on the package layer. The touch layer comprises: a first insulating layer, formed on the package layer; a first metal layer, formed on the first insulating layer, patterned to form a first floating electrode, a second floating electrode and a bridging electrode; a second insulating layer, formed on the first metal layer and covering the first metal layer, wherein the second insulating layer has a via; a second metal layer, formed on the second insulating layer, patterned to form a first touch electrode and a second touch electrode; and a passivation layer, formed on the second metal layer and covering the second metal layer; wherein the first touch electrode is electrically connected to the bridging electrode through the via, the first touch electrode has a first hallowed area, the second touch electrode has a second hallowed area, a projection of the first hallowed area on the package layer is overlapped with a projection of the first floating electrode on the package layer, and a projection of the second hallowed area on the package layer is overlapped with a projection of the second floating electrode on the package layer.

In addition, a display device is provided according to an embodiment of the present invention. The display device comprises the above-mentioned display panel in any one of the above embodiments. The details of the display panel are illustrated in the above and thus omitted here.

According to some embodiments of the present invention, the first touch electrode, the second touch electrode, the first floating electrode, the second electrode and the bridging electrode are all in a grid shape, and an area surrounded by a grid corresponds to a pixel unit.

According to some embodiments of the present invention, the first touch electrode comprises a disconnection position, and a projection of the disconnection position on the package layer falls within a projection of the bridging electrode on the package layer.

According to some embodiments of the present invention, the display panel further comprises a plurality of first touch electrodes and a plurality of second touch electrodes. The first touch electrodes are connected in series along a first direction and distributed in an array along a second direction, the second touch electrodes extend along the second direction and are equally spaced and distributed along the first direction, and the first direction is vertical to the second direction.

According to some embodiments of the present invention, the first touch electrode is a touch driving electrode, and the second touch electrode is a touch sensing electrode.

According to some embodiments of the present invention, the first touch electrode is a touch sensing electrode, and a second touch electrode is a touch driving electrode.

According to some embodiments of the present invention, the first floating electrode and the second floating electrode comprise a bending identification electrode, wherein the bending identification electrode is distributed in an array.

According to some embodiments of the present invention, the first metal layer further comprises a bending identification wire, and the bending identification wire is connected to the bending identification electrode.

According to some embodiments of the present invention, a projection of the bending identification wire on the package layer falls within a projection of the first touch electrode and the second touch electrode on the package layer.

According to some embodiments of the present invention, the first metal layer and the second metal layer are manufactured with a same material, which comprises one or more of aluminum, copper, silver, molybdenum, titanium, and ITO.

The present invention proposes a display panel and a display device. The display panel comprises a driving circuit layer, a light emitting layer, a package layer, and a touch layer formed on the package layer. The touch layer comprises: a first insulating layer, formed on the package layer; a first metal layer, formed on the first insulating layer, patterned to form a first floating electrode, a second floating electrode and a bridging electrode; a second insulating layer, formed on the first metal layer and covering the first metal layer, wherein the second insulating layer has a via; a second metal layer, formed on the second insulating layer, patterned to form a first touch electrode and a second touch electrode; and a passivation layer, formed on the second metal layer and covering the second metal layer; wherein the first touch electrode is electrically connected to the bridging electrode through the via, the first touch electrode has a first hallowed area, the second touch electrode has a second hallowed area, a projection of the first hallowed area on the package layer is overlapped with a projection of the first floating electrode on the package layer, and a projection of the second hallowed area on the package layer is overlapped with a projection of the second floating electrode on the package layer. In contrast to the conventional art having the floating electrode and the touch electrode in the same layer, the display panel and the display device of an embodiment of the present invention position the floating electrode and the touch electrode in different layers. Therefore, it does not need to consider the disconnection area between the floating electrode and the touch electrode when the floating electrode and the touch electrode are in the same layer. In this way, it prevents the short circuit problem between the first floating electrode and the first touch electrode or between the second floating electrode and the second touch electrode without sacrificing the optical consistency. This solves the short circuit and abnormal capacitance issues of the conventional DOT technique and raises the consistency of display content and the product yield. Furthermore, the bending identification wire is positioned in the first metal layer and a part of the floating electrode in the first metal layer is used as the identification sensing electrode of the bending position. It utilizes the self-capacitance to identify the bending position and thus realizes the integration of the touch electrode and the bending identification electrode.

Above are embodiments of the present invention, which does not limit the scope of the present invention. Any modifications, equivalent replacements or improvements within the spirit and principles of the embodiment described above should be covered by the protected scope of the invention.

What is claimed is:

1. A display panel, comprising a driving circuit layer, a light emitting layer, a package layer, and a touch layer formed on the package layer, wherein the touch layer comprises:
   a first insulating layer, formed on the package layer;
   a first metal layer, formed on the first insulating layer, patterned to form a first floating electrode, a second floating electrode and a bridging electrode;
   a second insulating layer, formed on the first metal layer and covering the first metal layer, wherein the second insulating layer has a via;
   a second metal layer, formed on the second insulating layer, patterned to form a first touch electrode and a second touch electrode, wherein the first touch electrode is electrically connected to the bridging electrode through the via, the first touch electrode has a first hallowed area, the second touch electrode has a second hallowed area, a projection of the first hallowed area on the package layer is overlapped with a projection of the first floating electrode on the package layer, and a projection of the second hallowed area on the package layer is overlapped with a projection of the second floating electrode on the package layer; and
   a passivation layer, formed on the second metal layer and covering the second metal layer,
   wherein the first floating electrode and the second floating electrode comprise a bending identification electrode, wherein the bending identification electrode is distributed in an array.

2. The display panel of claim 1, wherein the first touch electrode, the second touch electrode, the first floating electrode, the second electrode and the bridging electrode are all in a grid shape, and an area surrounded by a grid corresponds to a pixel unit.

3. The display panel of claim 2, wherein the first touch electrode comprises a disconnection position, and a projection of the disconnection position on the package layer falls within a projection of the bridging electrode on the package layer.

4. The display panel of claim 1, comprising a plurality of first touch electrodes and a plurality of second touch electrodes;
   wherein the first touch electrodes are connected in series along a first direction and distributed in an array along a second direction, the second touch electrodes extend along the second direction and are equally spaced and distributed along the first direction, and the first direction is vertical to the second direction.

5. The display panel of claim 4, wherein the first touch electrode is a touch driving electrode, and the second touch electrode is a touch sensing electrode.

6. The display panel of claim 4, wherein the first touch electrode is a touch sensing electrode, and a second touch electrode is a touch driving electrode.

7. The display panel of claim 1, wherein the first metal layer further comprises a bending identification wire, and the bending identification wire is connected to the bending identification electrode.

8. The display panel of claim 7, wherein a projection of the bending identification wire on the package layer falls within a projection of the first touch electrode and the second touch electrode on the package layer.

9. The display panel of claim 1, wherein the first metal layer and the second metal layer are manufactured with a same material, which comprises one or more of aluminum, copper, silver, molybdenum, titanium, and ITO.

10. A display device comprising a display panel, the display panel comprising a driving circuit layer, a light emitting layer, a package layer, and a touch layer formed on the package layer, wherein the touch layer comprises:
    a first insulating layer, formed on the package layer;
    a first metal layer, formed on the first insulating layer, patterned to form a first floating electrode, a second floating electrode and a bridging electrode;
    a second insulating layer, formed on the first metal layer and covering the first metal layer, wherein the second insulating layer has a via;
    a second metal layer, formed on the second insulating layer, patterned to form a first touch electrode and a second touch electrode, wherein the first touch electrode is electrically connected to the bridging electrode through the via, the first touch electrode has a first hallowed area, the second touch electrode has a second hallowed area, a projection of the first hallowed area on the package layer is overlapped with a projection of the first floating electrode on the package layer, and a projection of the second hallowed area on the package layer is overlapped with a projection of the second floating electrode on the package layer; and
    a passivation layer, formed on the second metal layer and covering the second metal layer,
    wherein the first floating electrode and the second floating electrode comprise a bending identification electrode, wherein the bending identification electrode is distributed in an array.

11. The display device of claim 10, wherein the first touch electrode, the second touch electrode, the first floating electrode, the second electrode and the bridging electrode are all in a grid shape, and an area surrounded by a grid corresponds to a pixel unit.

12. The display device of claim 11, wherein the first touch electrode comprises a disconnection position, and a projection of the disconnection position on the package layer falls within a projection of the bridging electrode on the package layer.

13. The display device of claim 10, wherein the display panel comprises a plurality of first touch electrodes and a plurality of second touch electrodes;
  wherein the first touch electrodes are connected in series along a first direction and distributed in an array along a second direction, the second touch electrodes extend along the second direction and are equally spaced and distributed along the first direction, and the first direction is vertical to the second direction.

14. The display device of claim 13, wherein the first touch electrode is a touch driving electrode, and the second touch electrode is a touch sensing electrode.

15. The display device of claim 13, wherein the first touch electrode is a touch sensing electrode, and a second touch electrode is a touch driving electrode.

16. The display device of claim 10, wherein the first metal layer further comprises a bending identification wire, and the bending identification wire is connected to the bending identification electrode.

17. The display device of claim 16, wherein a projection of the bending identification wire on the package layer falls within a projection of the first touch electrode and the second touch electrode on the package layer.

18. The display device of claim 10, wherein the first metal layer and the second metal layer are manufactured with a same material, which comprises one or more of aluminum, copper, silver, molybdenum, titanium, and ITO.

\* \* \* \* \*